United States Patent
Maruyama (10) Patent No.: US 10,146,441 B2
(45) Date of Patent: Dec. 4, 2018

(54) ARITHMETIC PROCESSING DEVICE AND METHOD FOR CONTROLLING ARITHMETIC PROCESSING DEVICE

(71) Applicant: FUJITSU LIMITED, Kawasaki-shi, Kanagawa (JP)

(72) Inventor: Masaharu Maruyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 28 days.

(21) Appl. No.: 15/415,941

(22) Filed: Jan. 26, 2017

(65) Prior Publication Data

US 2017/0300230 A1    Oct. 19, 2017

(30) Foreign Application Priority Data

Apr. 15, 2016 (JP) ................. 2016-082197

(51) Int. Cl.
*G06F 3/06* (2006.01)
*G06F 12/0875* (2016.01)
*G06F 12/0868* (2016.01)
*G06F 12/0804* (2016.01)

(52) U.S. Cl.
CPC ............ *G06F 3/061* (2013.01); *G06F 3/0656* (2013.01); *G06F 3/0659* (2013.01); *G06F 3/0673* (2013.01); *G06F 12/0868* (2013.01); *G06F 12/0875* (2013.01); *G06F 12/0804* (2013.01); *G06F 2212/1016* (2013.01); *G06F 2212/452* (2013.01)

(58) Field of Classification Search
USPC ........................................ 711/126
See application file for complete search history.

(56) References Cited

U.S. PATENT DOCUMENTS

| | | | | |
|---|---|---|---|---|
| 5,097,445 A * | 3/1992 | Yamauchi | ........... | G06F 12/1425 365/185.04 |
| 5,777,942 A * | 7/1998 | Dosaka | ................. | G11C 11/005 365/189.05 |
| 6,266,744 B1 * | 7/2001 | Hughes | ................. | G06F 9/3834 711/123 |
| 2001/0029571 A1 * | 10/2001 | Shibayama | ......... | G06F 12/0855 711/118 |
| 2002/0116551 A1 * | 8/2002 | Imamura | ................. | G06F 21/80 710/1 |
| 2005/0228962 A1 * | 10/2005 | Takase | ................ | G06F 12/0246 711/168 |
| 2006/0026369 A1 * | 2/2006 | Yamazaki | ............ | G06F 9/3017 711/154 |
| 2006/0026399 A1 | 2/2006 | Miura et al. | | |

(Continued)

FOREIGN PATENT DOCUMENTS

JP    2006-040143    2/2006

*Primary Examiner* — Mano Padmanabhan
*Assistant Examiner* — Jean C Edouard
(74) *Attorney, Agent, or Firm* — Fujitsu Patent Center (57) ABSTRACT

An arithmetic processing device includes: a processor that issues a store command and a load command; and a memory coupled to the processor, wherein the processor: includes a cache memory which stores data to be stored corresponding to the store command and a buffer including entries which stores the data to be stored; searches, in a case where the load command is issued, the entries; and selects, when data to be loaded corresponding to the load command is present in the entries, the data to be loaded from the buffer.

12 Claims, 9 Drawing Sheets

(56) References Cited

U.S. PATENT DOCUMENTS

| | | | |
|---|---|---|---|
| 2006/0123192 A1* | 6/2006 | Uno | G06F 3/0613 |
| | | | 711/113 |
| 2007/0050564 A1* | 3/2007 | Gunna | G06F 12/0831 |
| | | | 711/146 |
| 2008/0168233 A1* | 7/2008 | Luc | G06F 12/0804 |
| | | | 711/133 |
| 2009/0198894 A1* | 8/2009 | Walmsley | G06F 12/0859 |
| | | | 711/118 |
| 2010/0211746 A1* | 8/2010 | Tsukishiro | G06F 12/0804 |
| | | | 711/143 |
| 2012/0221809 A1* | 8/2012 | Yoshikawa | G06F 3/0613 |
| | | | 711/155 |
| 2013/0339624 A1* | 12/2013 | Sugizaki | G06F 12/0804 |
| | | | 711/136 |
| 2014/0089599 A1* | 3/2014 | Okawara | G06F 9/3017 |
| | | | 711/140 |

* cited by examiner

ARITHMETIC PROCESSING DEVICE AND METHOD FOR CONTROLLING ARITHMETIC PROCESSING DEVICE

CROSS-REFERENCE TO RELATED APPLICATION

This application is based upon and claims the benefit of priority of the prior Japanese Patent Application No. 2016-082197, filed on Apr. 15, 2016, the entire contents of which are incorporated herein by reference.

FIELD

The embodiment discussed herein relates to an arithmetic processing device and a method for controlling the arithmetic processing device.

BACKGROUND

An arithmetic processing device is provided with a store buffer for holding data to be stored when storing data in a cache memory or a main storage device.

Japanese Laid-Open Patent Publication No. 2006-40143 discloses a related technique.

SUMMARY

According to an aspect of the embodiments, an arithmetic processing device includes: a processor that issues a store command and a load command; and a memory coupled to the processor, wherein the processor: includes a cache memory which stores data to be stored corresponding to the store command and a buffer including entries which stores the data to be stored; searches, in a case where the load command is issued, the entries; and selects, when data to be loaded corresponding to the load command is present in the entries, the data to be loaded from the buffer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

A command control unit in an arithmetic processing device completes store processing before storing data in a cache memory or a main storage device with a store buffer. For example, this type of arithmetic processing device detects that data held in the store buffer, for which the processing for storing the data in the cache memory or the main storage device has not been completed, is data to be loaded (fetched) during load processing that follows the store processing. In order to handle such a situation, a store fetch bypass (SFB) control function is provided for extracting the data to be loaded from the store buffer and then loading the data. As a result, the command control unit of the arithmetic processing device completes the load (fetch) processing without waiting for the completion of the store processing for storing the data in the cache memory or the main storage device.

When a plurality of commands are executed at the same time in the arithmetic processing device, there is a chance that store requests and load requests pertaining to the same storage region may be issued multiple times at the same time. It may become difficult to correctly point out which data in the store buffer is to be read for each load request during SFB control when handling different data in the store buffer in response to the order of the execution and the like even though the same storage region is set as a loading target in a plurality of load requests.

As a result, when a plurality of store requests and load requests targeting the same storage region are present, a load request that does not wait until there is one remaining store request for storing the data in the store buffer may not be processed correctly, for example, while waiting for the previous store request to be actually processed and the store processing for storing in the cache memory or the main storage device. For example, when a plurality of SFB candidate data is present, the loading of data using the SFB control is restricted until the store requests are processed and one SFB control data remains. As a result, the time for the command control unit of the arithmetic processing device to complete the load requests increases.

For example, an arithmetic processing device may be provided that, even if a plurality of data subject to a load command and to be loaded into a buffer between the command control unit and the cache memory is present, appropriately selects one data to be loaded without waiting for the store processing and executes the loading of the data to be loaded from the buffer.

Figure 1:
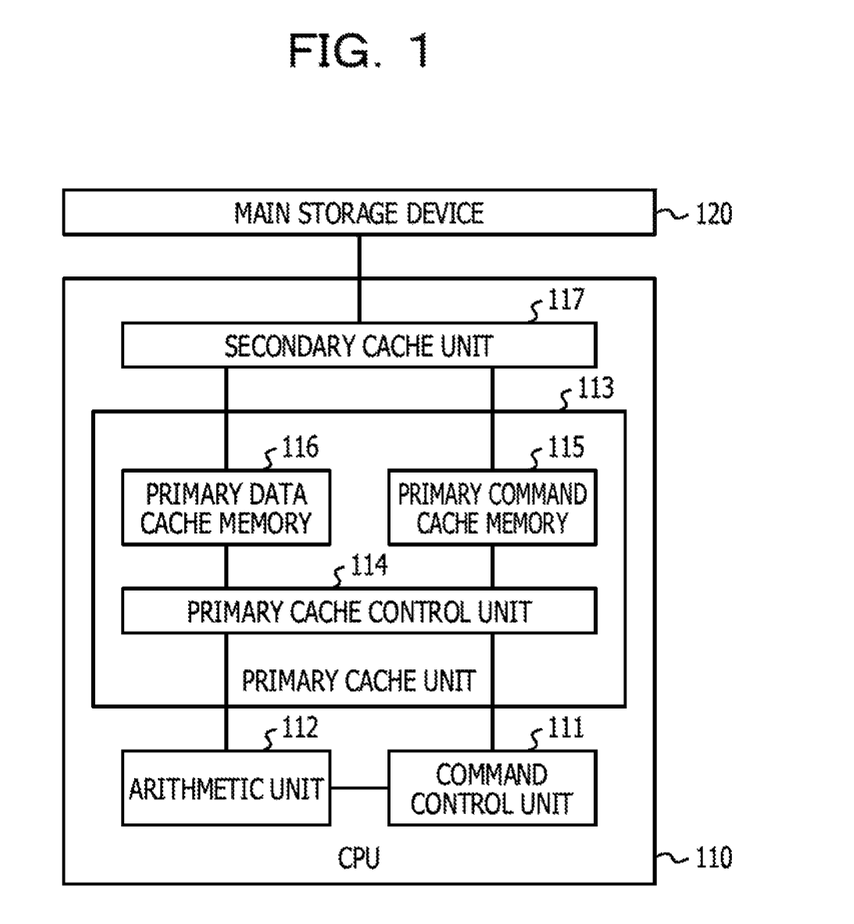
FIG. 1 illustrates an example of an arithmetic processing device.

FIG. 1 illustrates an example of an arithmetic processing device. The arithmetic processing device may be a processor for example. A processor 110 has a command control unit 111, an arithmetic unit 112, a primary cache unit 113, and a secondary cache unit 117. The processor 110 has a command pipeline and is connected to a main storage device (main memory) 120. The main storage device 120 stores commands and data and may be a memory that is capable of storing large amounts of data in comparison to a cache memory. The main storage device 120 may be, for example, a random access memory (RAM).

The command control unit 111 decodes received commands and issues the decoded commands to the computing unit 112 or the primary cache unit 113. The command control unit 111 issues store commands for storing data or load commands for loading data, for example, to the primary cache unit 113. The computing unit 112 carries out various types of computing such as arithmetic computing, logical computing, and address calculations according to the commands output by the command control unit 111, and stores the computing results in a primary data cache memory 116 in the primary cache unit 113.

The primary cache unit 113 has a primary cache control unit 114, a primary command cache memory 115, and the primary data cache memory 116. The primary cache control unit 114 carries out controls pertaining to the primary command cache memory 115 and the primary data cache memory 116 in response to commands output by the command control unit 111. The primary cache control unit 114 has a store buffer and a write buffer each having a plurality of entries. The primary cache control unit 114, for example, carries out store control for storing data in the primary data cache memory 116, or store fetch bypass (SFB) control for retrieving and loading data to be loaded to the store buffer or the write buffer when such data is present.

The primary command cache memory 115 may be a cache which can be accessed faster than a secondary cache memory, and stores a portion of the commands stored in the main storage device 120. The primary data cache memory 116 may be a cache memory which can be accessed faster than the secondary cache memory, and stores a portion of the data stored in the main storage device 120. The secondary cache unit 117 has the secondary cache memory for storing a portion of the commands and data stored in the main storage device 120. The secondary cache unit 117 supplies the commands or data (or commands and data read from the main storage device 120) stored in the secondary cache memory to the primary cache unit 113, and carries out store processing for storing data in the main storage device 120.

Figure 2:
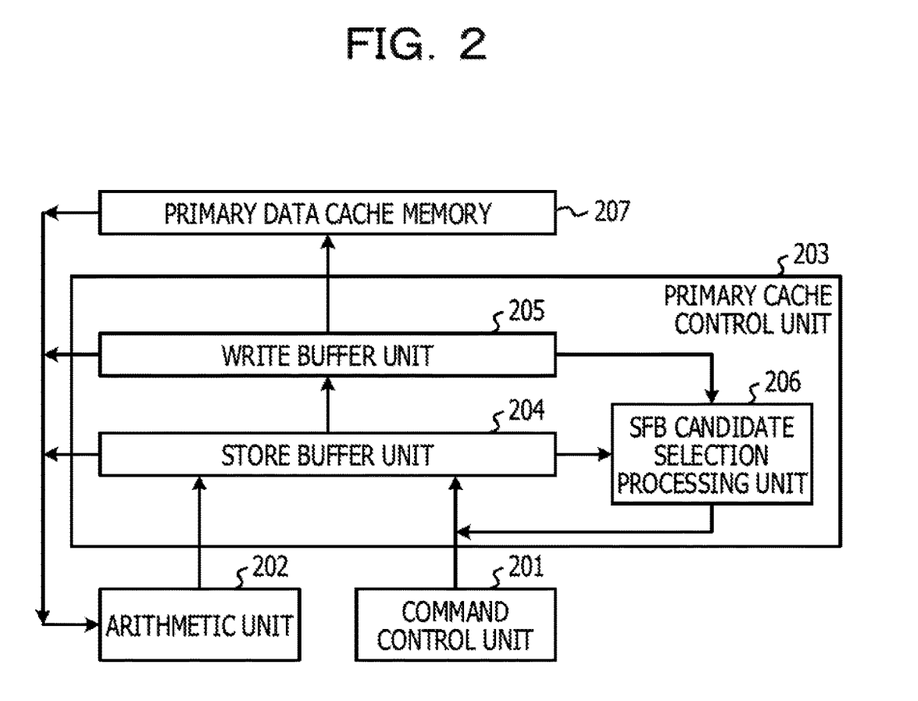
FIG. 2 illustrates an example of an SFB control system.

FIG. 2 illustrates an example of an SFB control system. When a store request (store command) from a command control unit 201 is sent during the store processing, data to be stored sent from a arithmetic unit 202 in response to the store request, is stored in a primary data cache memory 207 via a store buffer unit 204 and a write buffer unit 205 in a primary cache control unit 203. The data to be stored sent from the arithmetic unit 202 is first stored in any of a plurality of entries in the store buffer unit 204 and then stored in any of a plurality of entries of the write buffer unit 205, and thereafter stored in the primary data cache memory 207.

When a load request (load command) is sent from the command control unit 201 during the load processing for loading data, the primary cache control unit 203 determines whether the data stored in a store buffer entry or a write buffer entry with the store port number designated in the request, is SFB candidate data (data to be loaded). The basic determination conditions for determining whether the data is SFB candidate data may include: (1) the storage region to be loaded is included in the scope of the storage region for storing; (2) the data to be stored is already set in a register (data reception completed); and (3) the data request can be completed without raising an exception and the like. For example, the primary cache control unit 203 checks a virtual address (logical address) VA or data length information QBM stored in the designated store buffer entry or write buffer entry, and determines if the stored data is data waiting for store processing for storing the data in the same storage region as the data to be loaded, and is data that satisfies a condition pertaining to the data length. If the primary cache control unit 203 determines that the data is SFB candidate data, the data stored in the designated store buffer entry or write buffer entry is sent to the arithmetic unit 202.

At the same time that the above determination processing is being carried out, the primary cache control unit 203 searches through the plurality of entries in the store buffer unit 204 and the plurality of entries in the write buffer unit 205 and determines if any of the data stored in the entries could be SFB candidate data. For example, an SFB candidate selection processing unit 206 in the primary cache control unit 203 refers to the addresses or data length information pertaining to the load request and checks the virtual address (logical address) VA or the data length information QBM in each entry to determine if the data could be SFB candidate data. When a plurality of data that could be SFB candidate data is present, the SFB candidate selection processing unit 206 selects therefrom one data pertaining to the latest store command with respect to the load command, for example, the store command nearest the load command in the programming order, and designates the selected data as SFB candidate data. A request is issued for holding the store port number which designates the store buffer entry or write buffer entry in which the data chosen as SFB candidate data is stored.

If the data stored in the store buffer entry or write buffer entry of the store port number designated in the request is not SFB candidate data and the primary cache control unit 203 determines that there is no store buffer entry or write buffer entry storing data that could be SFB candidate data, the primary cache control unit 203 executes the load processing for loading the data into the primary data cache memory 207.

Figure 3:
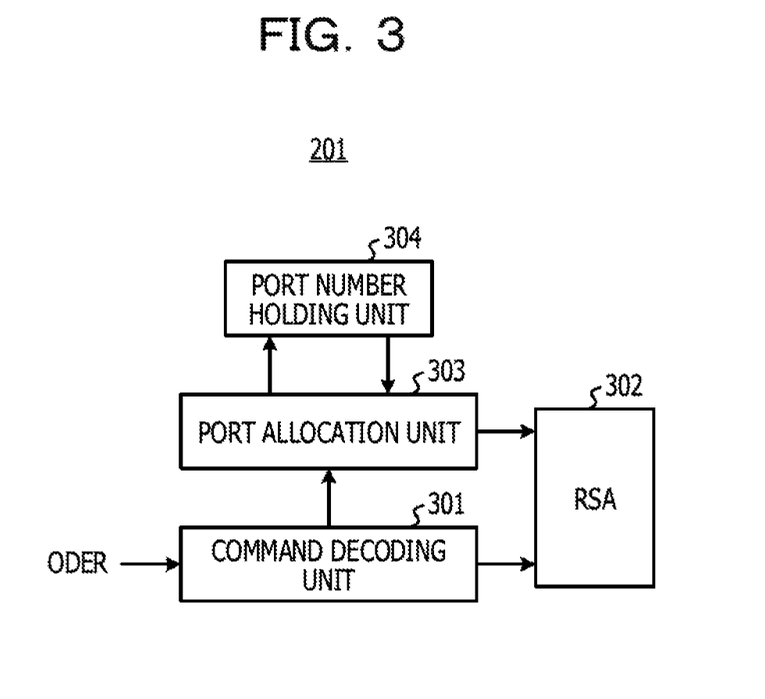
FIG. 3 illustrates an example of a command control unit.

FIG. 3 illustrates an example of a command control unit. While a configuration pertaining to the execution of a memory access command is depicted in FIG. 3, the command control unit 201 may also have a configuration for executing other commands such as computing commands or branch commands.

The command control unit 201 in FIG. 3 has a command decoding unit 301, a reservation station (RSA) 302, a port allocation unit 303, and a port number holding unit 304. The command decoding unit 301 decodes received commands and stores the decoded commands in a reservation station corresponding to the execution of the functions of the commands. When a decoded command is a memory access command (load command, store command), for example, the decoded command is stored in the reservation station (RSA) 302 for creating operand addresses. When the decoded command is an arithmetic command for example, the decoded command is stored in a reservation station (RSE/RSF) for arithmetic commands. The reservation station (RSA) 302 issues the memory access command to the primary cache unit when the stored memory access command becomes executable.

The port allocation unit 303 allocates a port to the memory access command decoded by the command decoding unit 301. The port allocation unit 303 controls the allocation of the entry number of a fetch port (FP) to be controlled by the primary cache unit when the command decoded by the command decoding unit 301 is a load command. The port allocation unit 303 controls the allocations to the fetch port (FP) and an entry number of a store port (SP) for storing the data to be stored when the command decoded by the command decoding unit 301 is a store command. The entry number of the store port (SP) is also registered in the fetch port (FP).

The port number holding unit 304 holds the entry number of the store port (SP) allocated to the last store command (latest store command) among the commands decoded by the command decoding unit 301. The entry number of the store port (SP) held by the port number holding unit 304 is updated to an entry number of a store port (SP) allocated to the store command when the command decoded by the command decoding unit 301 is a store command. The entry number of the store port (SP) held by the port number holding unit 304 is added to the load command to be issued by the command control unit 201.

For example, the reservation station (RSA) 302 reports the entry numbers of the fetch port (FP) and the store port (SP) allocated by the port allocation unit 303 when a store command is issued. The reservation station (RSA) 302 reports the entry number of the store port (SP) held by the port number holding unit 304 along with the entry numbers of the fetch port (FP) and the store port (SP) allocated by the port allocation unit 303 when a load command is issued. In this way, the allocated entry number of the store port (SP) is added to the latest store command and issued when the command control unit 201 issues a load command.

If the command subsequent to the store command is a load command when a plurality of commands are decoded at the same time, the entry numbers of the allocated store ports (SP) allocated to the store commands decoded at the same time, are allocated to the load command instead of the entry number of the store port (SP) held by the port number holding unit 304. As a result, the load command waits for the entry number of the store port (SP) of the latest store command.

Figure 4:
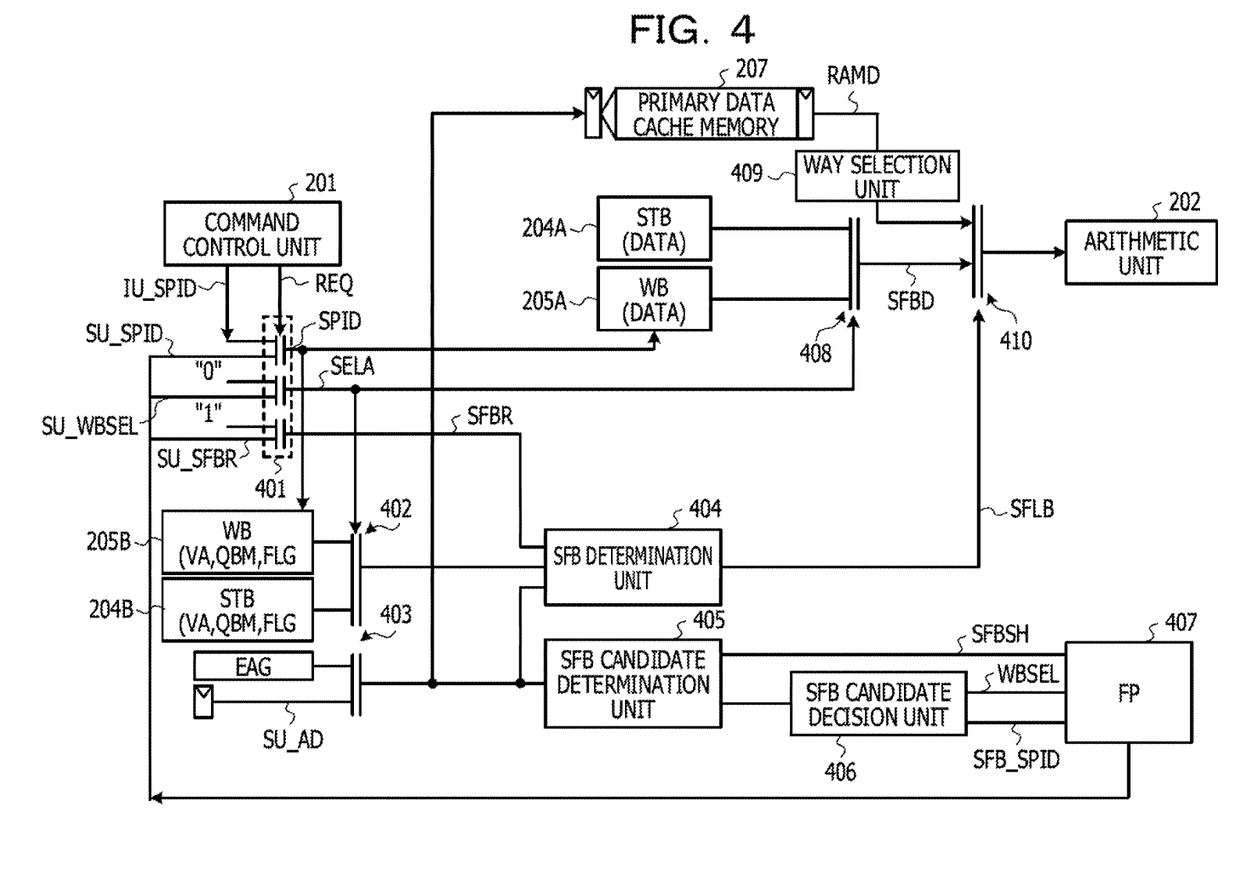
FIG. 4 illustrates an example of SFB control.

FIG. 4 illustrates an example of SFB control. A selector 401 carries out selection processing according to whether a request introduced into the pipeline is a request REQ from the command control unit 201, and then outputs a store port number SPID, a selection control signal SELA, and a SFB return signal SFBR. The selection control signal SELA is a signal for indicating whether the selection target is a write buffer or a store buffer. If the signal SELA is "1", the write buffer is set as the selection target, and if the signal SELA is "0", the store buffer is set as the selection target. The SFB return signal SFBR is a signal for indicating whether there is load processing pertaining to the SFB control. If the signal SFBR is "1", the processing is load processing pertaining to the SFB control, and if the signal SFBR is "0", the processing is not load processing pertaining to the SFB control.

If the request introduced into the pipeline is the request REQ from the command control unit 201, the selector 401 outputs a store port number IU_SPID delivered by the command control unit 201 as the store port number. The selection control signal SELA becomes "0" and the SFB return signal SFBR becomes "1". If the request introduced into the pipeline is not a request REQ from the command control unit 201, the selector 401 respectively outputs the store port number SU_SPID, a selection control signal SU_WBSEL, and a SFB return signal SU_SFBR read from a fetch port 407 as the store port number SPID, the selection control signal SELA, and the SFB return signal SFBR.

In response to the selection control signal SELA, a selector 402 selects and outputs the virtual address (logical address) VA, the data length information QBM, and flag information FLG read from the entry of a store buffer 204B or the entry from a write buffer 205B corresponding to the store port number SPID. When the selection control signal SELA is "1" and the write buffer is the selection target, for example, the selector 402 selects and outputs the virtual address VA, the data length information QBM, and the flag information FLG read from the write buffer 205B. When the selection control signal SELA is "0" and the store buffer is the selection target, for example, the selector 402 selects and outputs the virtual address VA, the data length information QBM, and the flag information FLG read from the store buffer 204B.

In response to whether or not the request introduced into the pipeline is the request REQ from the command control unit 201, a selector 403 selects and outputs an output SU_AD of an address creating unit (EAG) or a register. If the request introduced into the pipeline is the request REQ from the command control unit 201, the selector 403 selects and outputs the virtual address VA and the data length information QBM output by the address creating unit (EAG). If the request introduced into the pipeline is not the request REQ from the command control unit 201, the selector 403 selects and outputs the virtual address VA and the data length information QBM output by the register. The virtual address VA and the data length information QBM created by the address creating unit (EAG) when the request REQ from the command control unit 201 is introduced into the pipeline, is held in the register.

A SFB determination unit 404 determines whether loading of the data from the entry of the store buffer 204A or the write buffer 205B due to the SFB control is possible based on the SFB return signal SU_SFBR from the selector 401, the output of the selector 402, and the output of the selector 403. A selection control signal SELB is output in accordance with the determination result. The SFB determination unit 404 determines that the data using the SFB control can be loaded when it is determined that the SFB return signal SU_SFBR indicates "1", that is for example, indicates load processing pertaining to the SFB control, and when it is determined that the data is valid SFB candidate data based on the virtual address VA, the data length information QBM, and the flag information FLG output from the selector 402, and the virtual address VA and the data length information QBM output from the selector 403.

A SFB candidate determination unit 405 searches through the entries in the store buffer and the entries in the write buffer and determines if any of the data stored in the entries could be SFB candidate data. For example, the SFB candidate determination unit 405 refers to the virtual address VA and the data length information QBM output by the selector 403, checks the virtual address VA or the data length information QBM for each entry to determine whether the data could be SFB candidate data. When data that could be SFB candidate data is present, the SFB candidate determination unit 405 outputs a SFB search hit signal SFBSH and outputs the store port numbers corresponding to the store buffer entry and the write buffer entry in which the data that could be SFB candidate data is stored.

A SFB candidate decision unit 406 selects any one data of the data that is determined to possibly be SFB candidate data by the SFB candidate determination unit 405, as the SFB candidate data. The SFB candidate decision unit 406 selects the store port number allocated to the store command in the position nearest, in the program order, the store port numbers corresponding to the store buffer entry and the write buffer entry that store the data that could be the SFB candidate data output by the SFB candidate determination unit 405, and outputs the selected store port number as the store port number SFB_SPID of the SFB candidate. The SFB candidate decision unit 406 outputs the signal WBSEL indicating whether the selected store port number is a store port number of a store buffer or a write buffer.

Figure 9:
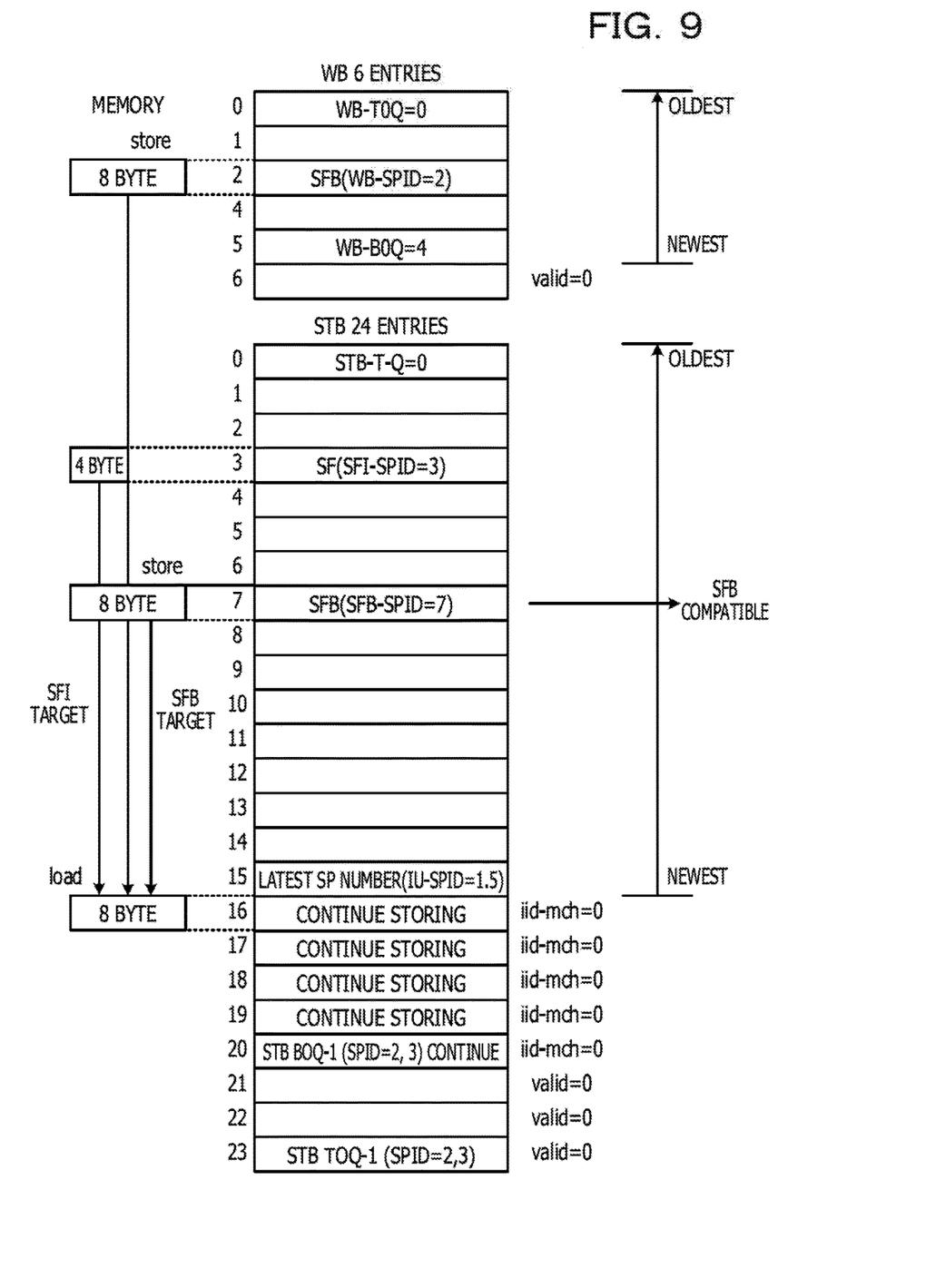
FIG. 9 illustrates an example of a decision method for an SFB candidate.

FIG. 9 illustrates an example of a decision method for an SFB candidate. FIG. 9 illustrates a method for deciding the SFB candidate by the SFB candidate decision unit 406. The store buffer has 24 entries and the write buffer has 6 entries in the example illustrated in FIG. 9. For example, the store buffer entry of the store port number 15 is allocated to the latest store command, and a load request is issued after that store command.

For example, the store buffer entries of store port numbers 7 and 3 and the write buffer entry of the store port number 2 are allocated to the store command for storing data in the same storage region as the load command. The data stored in the store buffer entry of the store port number 3 among the above entries is an SFI candidate that does not become an SFB candidate because the data length is shorter than the data length to be loaded with the load command. SFI (store-fetch-interlock) indicates a state in which data is to be fetched but the storing interferes with the fetching in the same access region.

As a result, the data stored in the store buffer entry of the store port number 7 and the write buffer entry of the store port number 2 may become SFB candidate data. At this time, the SFB candidate decision unit 406 chooses, as the SFB candidate data, the nearest SFB candidate (store buffer entry in store port number 7 in FIG. 9) in the direction from the store port number allocated to the latest store command to the top-of-queue of the store buffer (STB-TOQ), and then in the direction from the bottom-of-queue of the write buffer (WB-BOQ) to the top-of-queue of the write buffer (WB-TOQ).

The fetch port (FP) 407 may be a port for holding the load request or the store request from the command control unit 201. When the SFB search hit signal SFBSH is output, a SFB return flag is set by the fetch port (FP) 407, and when the signal WBSEL is output, a flag indicating whether the SFB candidate data is in a store buffer entry or a write buffer entry is set by the fetch port (FP) 407. The store port number SFB_SPID of the SFB candidate output by the SFB candidate decision unit 406 is set by the fetch port (FP) 407. The SFB return flag set by the fetch port (FP) 407, the flag indicating whether the SFB candidate data is in a store buffer entry or a write buffer entry, and the store port number of the SFB candidate are respectively read as the SFB return signal SU_SFBR, the selection control signal SU_WBSEL, and the store port number SU_SPID.

The selector 408 selects, in response to the selection control signal SELA, the data loaded from the store buffer 204A entry or the write buffer 205A entry corresponding to the store port number SPID and outputs the loaded data as SFB data SFBD. If the selection control signal SELA is "1", for example, and the selection target is a write buffer, a selector 408 outputs, as the SFB data SFBD, the data loaded from the write buffer 205A entry. If the selection control signal SELA is "0", for example, and the selection target is a store buffer, the selector 408 outputs the data read from the store buffer 204A entry as the SFB data SFBD.

A selector 410 selects the SFB data SFBD loaded from the store buffer 204A or the write buffer 205A, or data RAMD loaded by the primary data cache memory 207 and outputted via a weigh selection unit 409 and outputs the SFB data SFBD or the data RAMD to the arithmetic unit 202. When the selection control signal SELB indicates that the data can be loaded using the SFB control, the selector 410 selects the SFB data SFBD from the store buffer 204A or the write buffer 205A and outputs the SFB data SFBD to the arithmetic unit 202. When the selection control signal SELB does not indicate that the data can be loaded using the SFB control, the selector 410 selects the data RAMD from the primary data cache memory 207 and outputs the data RAMD to the arithmetic unit 202.

Figure 5:
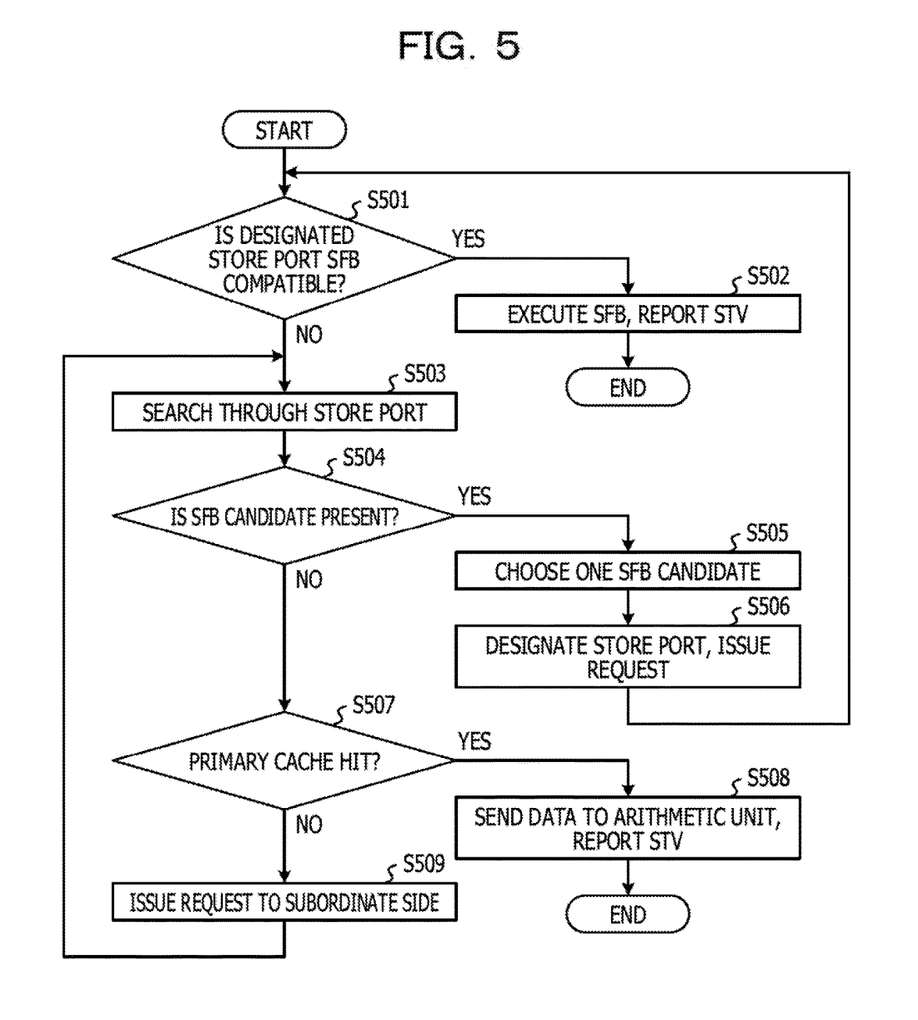
FIG. 5 illustrates an example of load command processing.

FIG. 5 illustrates an example of load command processing. When a load request (load) command is issued by the command control unit 201, the primary cache control unit 203 that receives the load request determines whether the store port designated in the request is SFB compatible in operation S501. For example, the primary cache control unit 203 determines whether the data stored in the store buffer entry or the write buffer entry with the store port number designated in the request, is SFB candidate data.

If the primary cache control unit 203 determines that the designated store port is SFB compatible, for example, if the data stored in the store buffer entry or the write buffer entry of the designated store port number is SFB candidate data (S501 Yes), the primary cache control unit 203 executes loading of the data using the SFB control in operation S502. For example, the primary cache control unit 203 loads the data from the store buffer entry or the write buffer entry of the designated store port number and sends the data to the arithmetic unit 202. The primary cache control unit 203 sends back a signal STV (status valid) indicating that the load request has been completed normally, to the command control unit 201, and the processing is finished.

If the primary cache control unit 203 determines that the designated store port is not SFB compatible (S501 No), the primary cache control unit 203 searches through the plurality of entries in the store buffer unit 204 and the plurality of entries in the write buffer unit 205 and determines if any of the data stored in the entries could be SFB candidate data in operation S503. In operation S504, the primary cache control unit 203 determines whether there is any data that could be SFB candidate in the store buffer and the write buffer.

If the primary cache control unit 203 determines that there is data that could be SFB candidate data in the store buffer and the write buffer (S504 Yes), the primary cache control unit 203 chooses one data based on the latest store command from among the data that could be SFB candidate data, as the SFB candidate data in operation S505. In operation S506, the primary cache control unit 203 designates the store port number corresponding to the store buffer entry or the write buffer entry in which the data chosen as the SFB candidate data is stored, and issues a load request. The processing returns to S501.

In returning to operation S501 from operation S506, the primary cache control unit 203 determines whether the store port designated in the request is SFB compatible in the same way as when the load request was received from the command control unit 201. At this time, the data stored in the store buffer entry or the write buffer entry of the designated store port number is data determined as data that could be SFB candidate data. As a result, the processing advances to operation S502 and the primary cache control unit 203 executes the loading of the data using the SFB control and sends the data to the arithmetic unit 202 and sends the STV signal back to the command control unit 201, and then the processing is finished.

In operation S504, if the primary cache control unit 203 determines that no data that could be SFB candidate is in the store buffer or the write buffer (No), the primary cache control unit 203 determines whether data to be loaded in the primary data cache memory 207 is stored in operation S507. When the primary cache control unit 203 determines that data to be loaded in the primary data cache memory 207 is stored, for example, when a primary cache hit is determined (S507 Yes), the primary cache control unit 203 loads the data from the primary data cache memory 207 and sends the data to the arithmetic unit 202 in operation S508. The primary cache control unit 203 sends back the signal STV indicating that the load request has been completed normally, to the command control unit 201, and the processing is finished.

When the primary cache control unit 203 determines that there is no data to be loaded in the primary data cache memory 207, for example, when a primary cache miss is determined (S507 No), the primary cache control unit 203 issues a load request to a subordinate side, for example, to the secondary cache memory in operation S509, and the processing returns to operation S503. The return of the processing to operation S503 after the primary cache control unit 203 issues the load request to the subordinate side, is carried out because load processing of the data for a load request to the subordinate side takes a certain amount of time. Data that could be SFB candidate data stored in the store buffer entry or the write buffer entry is quickly detected during that time, and the loading of the data due to the SFB control is carried out.

In order to facilitate understanding in the flow chart in FIG. 5, the operation for searching through the store ports and choosing the SFB candidate data is carried out after the operation for determining whether the data stored in the store port designated in the request is SFB candidate data. However, the operation for determining whether the data stored in the designated store port is SFB candidate data and the operation for searching through the store ports and choosing the SFB candidate data, may be executed in parallel.

Figure 6:
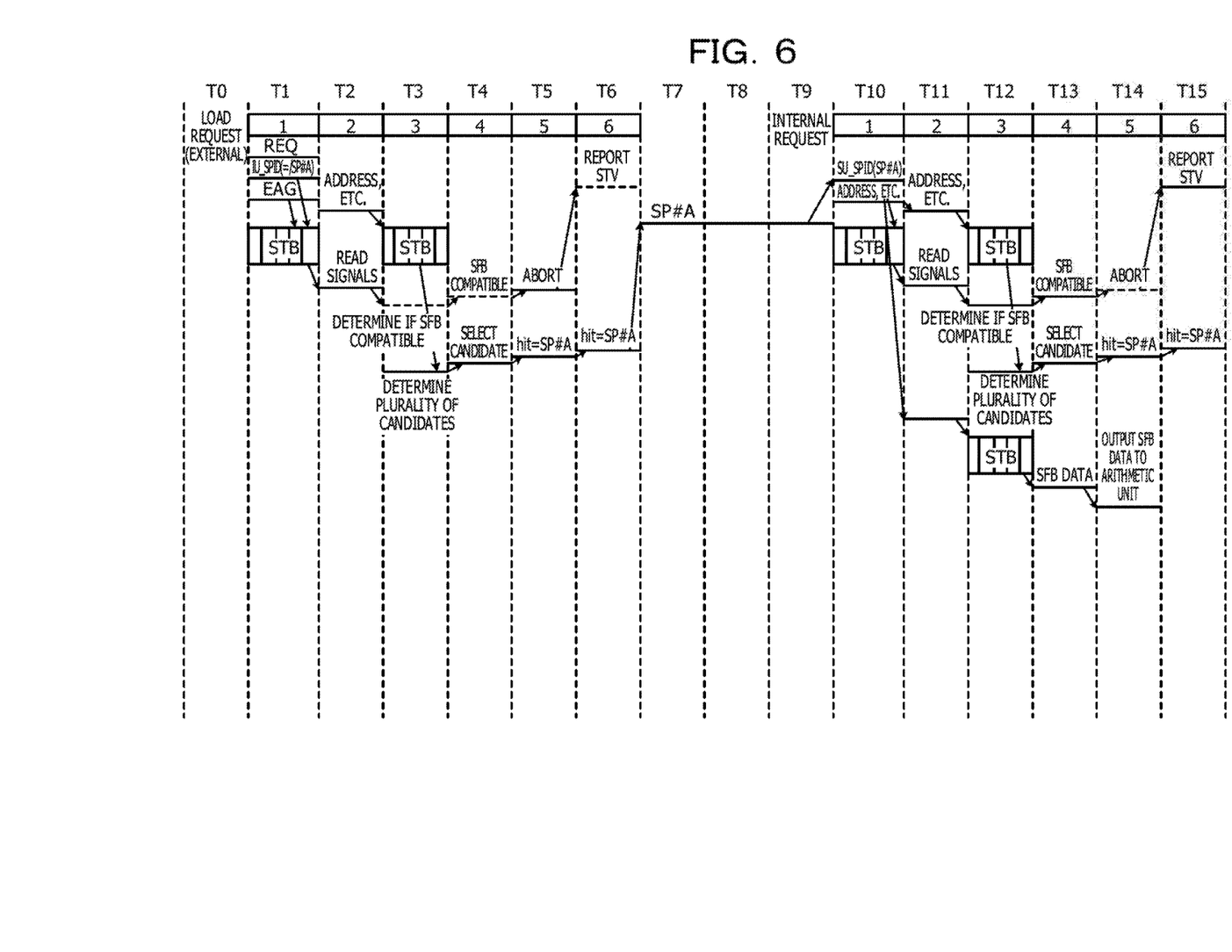
FIG. 6 illustrates an example of load processing using SFB control.

FIG. 6 illustrates an example of load processing using the SFB control. In FIG. 6, the data of the store buffer entry or the write buffer entry of the store port number designated in the load request from the command control unit 201 (external), is not SFB candidate data, and the SFB candidate data is chosen by searching through the store buffer entries and the write buffer entries, and then data loading is carried out. For example, the SFB candidate data is stored in a store buffer entry or a write buffer entry with the store port number SP#A.

At time T1, a load request in which a store port number other than SP#A is designated is input by the command control unit 201 and introduced into the pipeline of the primary cache control unit 203. At this time, access to the store buffer and the write buffer is carried out based on the store port number designated in the load request from the command control unit 201. At time T2, an address created by an address creation unit is selected, and the signals from the store buffer and the write buffer are read.

A determination is made as to whether loading of the data using the SFB control is possible based on the signals read from the store buffer and the write buffer according to the store port number designated in the load request from the command control unit 201, and the address created by the address creating unit (time T3). When it is determined that the loading of the data through the SFB control is not possible, the pipeline is aborted (time T5). No STV reporting to the command control unit 201 is carried out at this time.

The addresses created by the address creation unit are referenced and searching is carried out on the store buffer entries and the write buffer entries. A determination is made as to whether the stored data could be SFB candidate data (time T3), and one SFB candidate data is selected (time T4). In this example, the data stored in the store buffer entry or the write buffer entry with the store port number #A is selected as the SFB candidate data.

Thereafter at the time T10, a load request (internal request) in which SP#A is designated as the store port number is introduced into the pipeline of the primary cache control unit 203. Access to the store buffer and the write buffer is carried out based on the store port number SP#A designated in the load request. At time T11, the signals from the store buffer and the write buffer are read.

A determination is made as to whether loading of the data using the SFB control is possible based on the signals read from the store buffer and the write buffer according to the store port number SP#A designated in the load request, and the address created by the address creating unit (time T12). When it is determined that data loading using the SFB control is possible as a result of the determination (time T13), the data (SFB data) loaded from the store buffer entry or the write buffer entry having the store port number SP#A at time T13, is output to the arithmetic unit 202 (time T14). At time T15, the STV reporting to the command control unit 201 is carried out and the data loading processing is finished.

At the time T12 as well, the created address is referenced, the searching through the store buffer entries and the write buffer entries is carried out, the determination as to whether the data could be SFB candidate data is made, and the selection of one SFB candidate data is carried out. Because the STV reporting to the command control unit 201 is carried out and the data loading processing is finished at the time T15, the processing results from the time T12 and onward are discarded and do not affect the operations.

Figure 7:
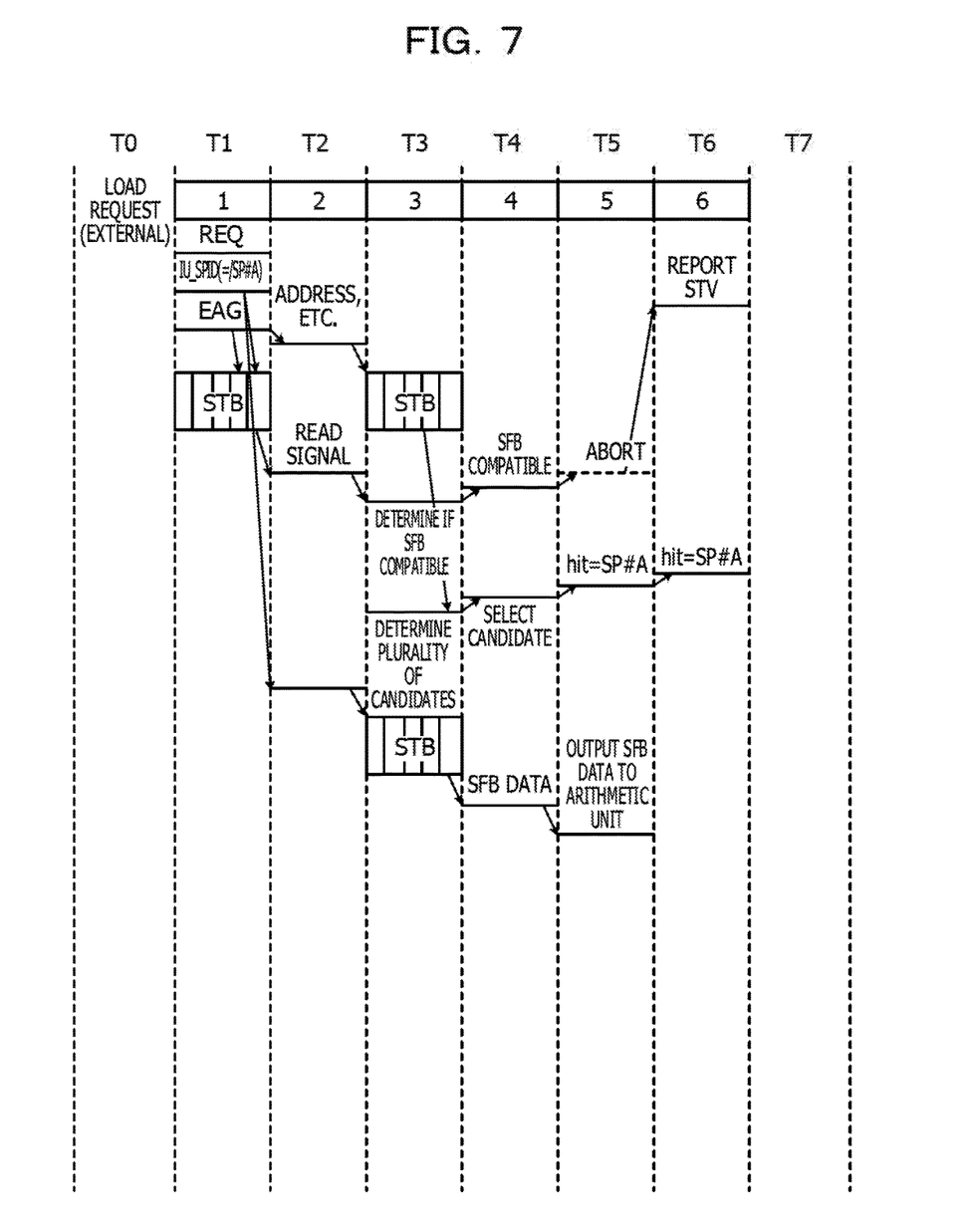
FIG. 7 illustrates an example of load processing using SFB control.

FIG. 7 illustrates an example of load processing using the SFB control. FIG. 7 illustrates an example in which the data of the store buffer entry or the write buffer entry of the store port number designated in the load request from the command control unit 201 (external), is SFB candidate data. For example, the SFB candidate data is stored in a store buffer entry or a write buffer entry with the store port number SP#A.

At time T1, a load request in which SP#A is designated as the store port number is input by the command control unit 201 and introduced into the pipeline of the primary cache control unit 203. At this time, access to the store buffer and the write buffer is carried out based on the store port number designated in the load request from the command control unit 201. At time T2, an address created by an address creation unit is selected, and the signals from the store buffer and the write buffer are read.

A determination is made as to whether loading of the data using the SFB control is possible based on the signals read from the store buffer and the write buffer according to the store port number SP#A designated in the load request, and the address created by the address creating unit (time T3). When it is determined that data loading using the SFB control is possible as a result of the determination (time T4), the data (SFB data) loaded from the store buffer entry or the write buffer entry having the store port number SP#A at time T3, is output to the arithmetic unit 202 (time T5). At time T6, the STV reporting to the command control unit 201 is carried out and the data loading processing is finished.

Even in FIG. 7, the created address is referenced, the searching through the store buffer entries and the write buffer entries is carried out, the determination as to whether the data could be SFB candidate data is made, and selection of one SFB candidate data is carried out. However, because the STV reporting to the command control unit 201 is carried out and the data loading processing is finished at the time T6, the processing results are discarded and do not affect the operations.

A store command for storing the SFB candidate data may be newly set in the store buffer accompanying the fixed time period from the time that the searching for the SFB candidate data is carried out until the SFB candidate data is read. If the newly set store command is the latest store command, the load processing of the SFB candidate data is aborted and the processing for loading the SFB candidate data after the store port number has been updated in order to load the SFB candidate data, is not carried out. For example in FIG. 9, after the data of the store buffer entry of the store port number 7 is chosen as the SFB candidate data, a check may be carried out to determine whether or not a store command for storing the SFB candidate data has been newly set in the store buffer entries between the store port number 7 that is the SFB candidate and the store port number 15 allocated to the latest store command.

When a load command is issued by the command control unit 201, the primary cache control unit 203 searches through the entries in the store buffer and the entries in the write buffer and determines if the data stored in the entries could be SFB candidate data. If there is a plurality of data that could be the SFB candidate data, the primary cache control unit 203 chooses, from the plurality of data, one data pertaining to the latest store command with respect to the load command as the SFB candidate data and carries out the data loading using the SFB control. As a result, even if a plurality of data that could be the SFB candidate data is present in the store buffer and the write buffer, one data is appropriately selected without waiting for the storing processing of the other data, and the data loading using the SFB control is carried out. It is possible that the processing performance of the processor can be improved.

Because the data loaded using a load command is often data to be stored using the latest store command, the entry number of the store port allocated to the latest store command is also reported when issuing the load command from the command control unit 201. As a result, data loading using the SFB control can be carried out without waiting for searching for the data that could be SFB candidate data, and consequently the processing performance of the processor may be improved.

Store processing of data in a configuration having a store buffer and a write buffer is carried out as explained below. A store command issued by the command control unit 201 is stored once in the store buffer by the primary cache control unit 203. At the same time, the data to be stored is sent from the arithmetic unit 202 to the primary cache control unit 203. If the store processing is carried out normally without an exception factor such as an address exception, the primary cache control unit 203 sends the signal STV back to the command control unit 201. The command control unit 201 that receives the STV signal completes the store command (committed). For example, because the store command is committed before the data to be stored is actually stored in the primary data cache memory 207 (store command abandonment control), the store command can be processed quickly. When the commit report of the store command is sent from the command control unit 201 to the primary cache control unit 203, the primary cache control unit 203 moves the data to be stored from the store buffer to the write buffer (the signal for indicating the movement is referred to as a write buffer go signal WB_GO). Thereafter, the pipeline of the primary cache control unit 203 is activated by the write buffer and the store operation to the primary data cache memory 207 is actually carried out.

After the data stored in the store buffer entry is chosen as the SFB candidate data in the aforementioned SFB control method, the SFB candidate data may be moved from the store buffer to the write buffer before carrying out the loading of the data in this type of store operation. In this case, the pipeline for loading the data may be aborted and the processing time may increase because the SFB candidate data is not present in the store buffer. As a result, a control mechanism such as the one illustrated in FIG. 8 may be provided. The movement of the SFB candidate data from the store buffer to the write buffer after the data has been chosen as the SFB candidate data may be reduced for a period of a number of cycles.

Figure 8:
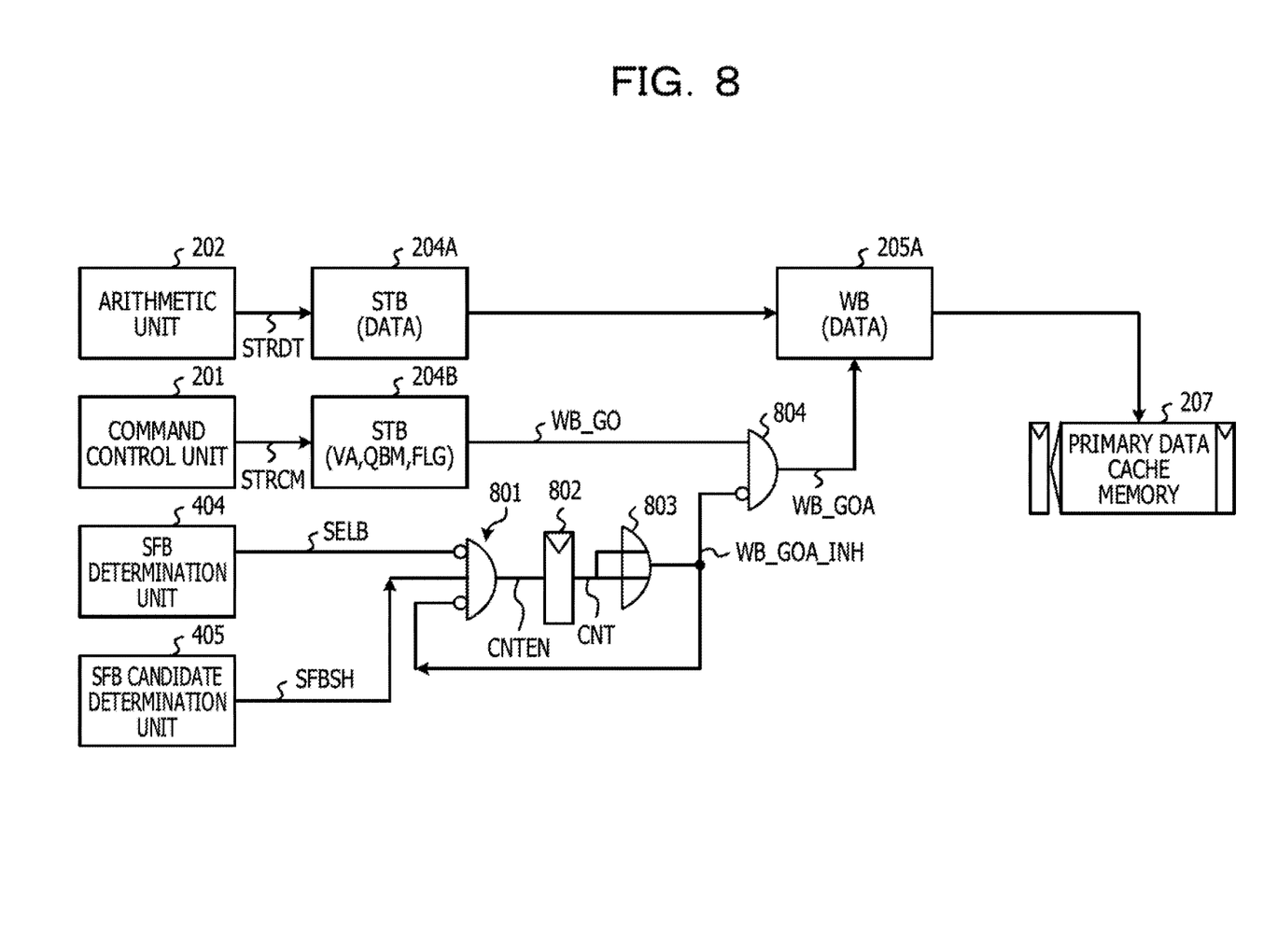
FIG. 8 illustrates an example of store control from a store buffer to a write buffer.

FIG. 8 illustrates an example of a store control from a store buffer to a write buffer. When a commit report STRCM of the store command is sent from the command control unit 201 to the store buffer 204B, the store buffer 204B outputs a first write buffer go signal WB-GO. The data to be stored STRDT output by the arithmetic unit 202 and pertaining to the store command is stored in the store buffer 204A and via the write buffer 205A in the primary data cache memory 207. At this time, the storing of the data to be stored from the store buffer 204A to the write buffer 205A is executed according to a second write buffer go signal WB_GOA.

The selection control signal SELB output by the SFB determination unit 404, the SFB search hit signal SFBSH output by the SFB candidate determination unit 405, and a write buffer go inhibit signal WB_GO_INH are input into an AND (logical product operation) circuit 801, and the operation result is output as a counter control signal CNTEN. For example, if the selection control signal SELB is "0", the SFB search hit signal SFBSH is "1", and the write buffer go inhibit signal WB_GO_INH is "0", the AND circuit 801 sets the counter control signal CNTEN to "1" and in any other case sets the counter control signal CNTEN to "0". For example, when data loading using the SFB control is not possible and data that could be SFB candidate data is found by searching through the store buffer entries and the write buffer entries while the counter control signal CNTEN is "0", the counter control signal CNTEN becomes "1".

A counter 802 sets the count value to a predetermined value and decrements the count value by one for each cycle when the counter control signal CNTEN is changed from "0" to "1". The predetermined value may be decided in response to a period in which the transmission of the first write buffer go signal WB_GO is to be inhibited, and thus, for example, the predetermined value may be set to "8" when the an 8-cycle period is to be inhibited. An OR (logical sum operation) circuit 803 receives the output of the counter 802 and outputs the arithmetic result as the write buffer go inhibit signal WB_GO_INH. For example, the OR circuit 803 sets the write buffer go inhibit signal WB_GO_INH to "1" when the count value of the counter 802 is not "0" (at least one output bit is "1"), and sets the write buffer go inhibit signal WB_GO_INH to "0" when the count value of the counter 802 is "0" (all output bits are "0").

An AND circuit 804 receives the first write buffer go signal WB_GO and the write buffer go inhibit signal WB_GO_INH and outputs the arithmetic result as the second write buffer go signal WB_GOA. The AND circuit 804 sets the second write buffer go signal WB_GOA to "0" (storing of data to be stored in write buffer is not permitted) when the write buffer go inhibit signal WB_GO_INH is "1" regardless of the first write buffer go signal WB_GO. As a result, the transmission of the first write buffer go signal WB_GO may be reduced. The AND circuit 804 outputs the first write buffer go signal WB_GO as the second write buffer go signal WB_GOA when the write buffer go inhibit signal WB_GO_INH is "0". Therefore, if the write buffer go inhibit signal WB_GO_INH is "0", the second write buffer go signal WB_GOA is set to "0" (storing of the data to be stored in the write buffer is not permitted) if the first write buffer go signal WB_GO is "0", and the second write buffer go signal WB_GOA is set to "1" (storing of the data to be stored in the write buffer is permitted) if the first write buffer go signal WB_GO is "1".

After the data stored in the store buffer entry is chosen as the SFB candidate data in FIG. 8, the movement of the SFB candidate data to the write buffer may be reduced during a predetermined time period. As a result, the loading of the data using the SFB control may be carried out without an increase in the processing time. Because the count value of the counter 802 is repeatedly set to the next predetermined value and the delay of the movement of the data from the store buffer to the write buffer is reduced, the counter control signal CNTEN may be inhibited from becoming "1" after the count value of the counter 802 becomes "0". For example, during a predetermined time period after the inhibition of the storing from the store buffer to the write buffer is released, the inhibition of the storing from the store buffer to the write buffer may be prohibited (the store processing permitted state may continue).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An arithmetic processing device comprising:
  a processor that issues a store command and a load command; and
  a memory coupled to the processor, the processor:
  includes a cache memory which stores data to be stored corresponding to the store command and a buffer including entries which stores the data to be stored;
  outputs, along with the load command, information indicating entry included in the entries and allocated to the latest store command with respect to the load command when the load command is issued;
  read, when data stored in the entry designated by the information is data to be loaded corresponding to the load command, the data from the entry;
  searches, when the data stored in the entry designated by the information is not the data to be loaded, the entries;
  determines whether each data stored in the respective entries is the data to be loaded;
  issues, when determining the data stored in the one of the entries is the data to be loaded, a new load command with new information indicating the one of the entries; and
  accesses, when the data stored in the respective entries is not the data to be loaded, the cache memory to acquire the data to be loaded.

2. The arithmetic processing device according to claim 1, wherein the processor selects, when a plurality of data in the entries are the data to be loaded, one data from the plurality of data as data to be loaded.

3. The arithmetic processing device according to claim 1, wherein the processor:
  holds the information and updates the information each time a control which allocates the entry to the store command is performed; and
  outputs the information along with the load command when the load command is issued.

4. The arithmetic processing device according to claim 1, wherein: the buffer has a store buffer including first entries which stores the data to be stored, and a write buffer including second entries which stores the data to be stored between the store buffer and the cache memory, and writing of data from the store buffer to the write buffer is inhibited during a time period after the data to be loaded is selected.

5. The arithmetic processing device according to claim 4, wherein: an inhibition of writing of data from the store buffer to the write buffer is inhibited during a time period after releasing the inhibition of the writing of data from the store buffer to the write buffer.

6. The arithmetic processing device according to claim 1, wherein: the processor executes searching through the entries and selecting the data to be loaded concurrently while reading of the data to be loaded from the buffer.

7. A method of controlling an arithmetic processing device, comprising:
  outputting, by an arithmetic processing device including a cache memory which stores data to be stored corresponding a store command and a buffer including entries which stores the data to be stored, along with a load command, information indicating entry included in the entries and allocated to the latest store command with respect to the load command when the load command is issued;
  reading, when data stored in the entry designated by the information is data to be loaded corresponding to the load command, the data from the entry;
  searching, when the data stored in the entry designated by the information is not the data to be loaded, the entries;
  determining whether each data stored in the respective entries is the data to be loaded;
  issuing, when determining the data stored in the one of the entries is the data to be loaded, a new load command with new information indicating the one of the entries; and
  accessing, when the data stored in the respective entries is not the data to be loaded, the cache memory to acquire the data to be loaded.

8. The method according to claim 7, further comprising selecting, when a plurality of data in the entries are the data to be loaded, one data from the plurality of data as data to be loaded.

9. The method according to claim 7, further comprising:
  holding the information and updates the information each time a control which allocates the entry to the store command is performed; and
  outputting the information along with the load command when the load command is issued.

10. The method according to claim 7, wherein: the buffer has a store buffer including first entries which stores the data to be stored, and a write buffer including second entries which stores the data to be stored between the store buffer and the cache memory, and writing of data from the store buffer to the write buffer is inhibited during a time period after the data to be loaded is selected.

11. The method according to claim 10, wherein: an inhibition of writing of data from the store buffer to the write buffer is inhibited during a time period after releasing the inhibition of the writing of data from the store buffer to the write buffer.

12. The method according to claim 7, further comprising:
  executing searching through the entries and selecting the data to be loaded concurrently while reading of the data to be loaded from the buffer.

* * * * *